(12) United States Patent
Mueller et al.

(10) Patent No.: US 10,595,244 B2
(45) Date of Patent: Mar. 17, 2020

(54) RADIO BASE STATION AND METHOD FOR ASCERTAINING A SIGNAL QUALITY OF A RADIO LINK BETWEEN THE RADIO BASE STATION AND AT LEAST ONE RADIO SUBSCRIBER STATION

(71) Applicant: Siemens Aktiengesellschaft, Munich (DE)

(72) Inventors: Joerg Mueller, Linkenheim (DE); Wilhelm Busch, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/088,778

(22) PCT Filed: Mar. 1, 2017

(86) PCT No.: PCT/EP2017/054697
§ 371 (c)(1),
(2) Date: Sep. 26, 2018

(87) PCT Pub. No.: WO2017/167523
PCT Pub. Date: Oct. 5, 2017

(65) Prior Publication Data
US 2019/0342806 A1 Nov. 7, 2019

(30) Foreign Application Priority Data
Mar. 30, 2016 (EP) .................... 16162880

(51) Int. Cl.
*H04L 12/28* (2006.01)
*H04W 36/00* (2009.01)
(Continued)

(52) U.S. Cl.
CPC ... *H04W 36/0088* (2013.01); *H04W 36/0072* (2013.01); *H04W 36/00837* (2018.08);
(Continued)

(58) Field of Classification Search
CPC ........... H04W 36/0072; H04W 72/085; H04W 72/0446; H04W 84/12; H04W 36/0088; H04W 36/00837
(Continued)

(56) References Cited

U.S. PATENT DOCUMENTS 7,929,508 B1 4/2011 Yucek et al.
10,264,502 B2 * 4/2019 Wegmann ......... H04W 36/0088
(Continued)

FOREIGN PATENT DOCUMENTS

CN 103391633 11/2013
CN 103891164 6/2014
(Continued)

OTHER PUBLICATIONS

Office Action dated Mar. 5, 2019 issued in Chinese Patent Application No. 201780013583.3.
(Continued)

*Primary Examiner* — John Pezzlo
(74) *Attorney, Agent, or Firm* — Cozen O'Connor

(57) ABSTRACT

A radio base station periodically sends first datagrams about an availability of signal parameters measured on the radio base station to ascertain a signal quality of a radio link between a radio base station and at least one radio subscriber station, wherein the radio subscriber station, following initiation of an ascertainment of the signal quality of the radio link between the radio base station and the radio subscriber station and on reception of a first datagram, transmits a second datagram with a request for measurement of signal parameters to the radio base station, and upon reception of a second datagram, the radio base station and the radio subscriber station simultaneously perform captures of
(Continued)

respective locally measured signal parameters of the radio link between the radio base station and the radio subscriber station.

14 Claims, 3 Drawing Sheets

(51) Int. Cl.
*H04W 72/04* (2009.01)
*H04W 72/08* (2009.01)
*H04J 1/16* (2006.01)
*H04W 84/12* (2009.01)

(52) U.S. Cl.
CPC ..... *H04W 72/0446* (2013.01); *H04W 72/085* (2013.01); *H04W 84/12* (2013.01)

(58) Field of Classification Search
USPC .................................. 370/252, 278, 329, 386
See application file for complete search history.

(56) References Cited

U.S. PATENT DOCUMENTS

| | | | |
|---|---|---|---|
| 2011/0275361 A1* | 11/2011 | Yavuz | H04W 52/143 455/422.1 |
| 2012/0134280 A1 | 5/2012 | Rotvold et al. | |
| 2015/0078360 A1 | 3/2015 | Wang et al. | |
| 2016/0352625 A1* | 12/2016 | Kim | H04B 7/0408 |

FOREIGN PATENT DOCUMENTS

| | | |
|---|---|---|
| EP | 2328370 | 6/2011 |
| EP | 2421297 | 2/2012 |
| WO | WO2010/097722 | 9/2010 |
| WO | WO 2013/048305 | 4/2013 |

OTHER PUBLICATIONS

PCT International Search Report and Written Opinion of International Searching Authority dated Apr. 26, 2017 corresponding to PCT International Application No. PXT/EP2017/054697 filed Mar. 1, 2017.

* cited by examiner ized to perform the method according to the invention. The radio base station includes a processor and a memory in which computer-readable instructions are stored, upon execution of which the radio base station is caused to perform the
RADIO BASE STATION AND METHOD FOR ASCERTAINING A SIGNAL QUALITY OF A RADIO LINK BETWEEN THE RADIO BASE STATION AND AT LEAST ONE RADIO SUBSCRIBER STATION

CROSS-REFERENCE TO RELATED APPLICATIONS

This is a U.S. national stage of application No. PCT/EP2017/054697 filed Mar. 1, 2017. Priority is claimed on EP Application No. 16162880 filed Mar. 30, 2016, the content of which is incorporated herein by reference in its entirety.

BACKGROUND OF THE INVENTION

1. Field of the Invention

The present invention relates to a method for ascertaining a signal quality of a radio link between a radio base station and at least one radio subscriber station, and also a radio base station suitable for implementing the method, in particular a radio base station of an industrial automation system.

2. Description of the Related Art

Industrial automation systems serve to monitor, control and regulate technical processes, particularly in the manufacturing, process automation and building automation sectors, and enable an operation of control devices, sensors, machines and industrial plants which is intended to occur as autonomously and as independently from human intervention as possible. Due to the constantly increasing importance of information technology for automation systems that comprise numerous networked control units and computer units, methods for the reliable provision of functions distributed over an automation system to provide monitoring, control and regulation functions are becoming increasingly important.

Interruptions of communication connections between computer units of an industrial automation system or automation devices can result in an unwanted or unnecessary repetition of a transmission of a service request. This causes an additional utilization of communication connections of the industrial automation system, which may result in further system disruptions or faults. Furthermore, messages not transmitted or not incompletely transmitted may, for example, prevent an industrial automation system from switching to or remaining in a safe operating condition. This may ultimately result in a failure of an entire production plant and a costly production stoppage. A particular problem regularly occurs in industrial automation systems as a result of a message traffic with proportionally numerous but relatively short messages, as a result of which the above problems are exacerbated.

EP2328370 A1 discloses a method for interference measurement in a wireless communication system is known from A1, where a communication device of the wireless communication system initially stops a transmission of useful data and then generates a data packet with test data. This data packet is transmitted to other communication devices within the wireless communication system. Average delays in a respective radio channel access are determined for a transmission of the data packet with test data. Interferences within the wireless communication system are ascertained based on the average radio channel access delays.

EP 2 421 297 B1 describes a method for channel change in a wireless communication network which comprises an access node and a plurality of clients. The communication network uses one of a plurality of possible channels in a specified frequency range as a secondary user for data communication. Data communication occurs between the access nodes and the clients via a first transmission/reception interface of the access node on a first possible channel. The possible channels are checked by a second transmission/reception interface of the access node via the first transceiver interface parallel to the data communication to determine what channels are free which are not being used by a primary user. If a preferential use of the first channel by a primary user is determined by the access node of the communication network, then a channel change takes place from the first channel to one of the free channels.

U.S. Pat. No. 7,929,508 B1 relates to a signal analysis method for processing and classifying radio signals received by a WLAN communication device. A plurality of spectral data measured values are captured that comprise time-frequency data and reception signal strength indicators that are allocated to the radio signals received by the WLAN communication device. The time-frequency data and reception signal strength indicators for each spectral data measured value are analyzed to determine whether the respective spectral data measured value is allocated to a narrowband signal. If a narrowband signal is present, then a narrowband interference signal is determined that is allocated to the radio signals received by the WLAN communication device, based on of parameters of the spectral data measured values.

Particularly in industrial automation systems, precise analyses of the connections between WLAN access points and WLAN clients are extremely helpful during commissioning and in ongoing operation, in particular for classifying connection paths and resulting data rates. Connection analyses of this type are based on parameters of received one-way signals.

SUMMARY OF THE INVENTION

It is an object of the present invention to provide a method for ascertaining a signal quality of a radio link between a radio base station and at least one radio subscriber station with improved accuracy, as well as devices suitable for performing the method.

This and other objects and advantages are achieved in accordance with the invention by a method and by a radio base station including a processor and memory, where to ascertain a signal quality of a radio link between a radio base station and at least one radio subscriber station, the radio base station periodically transmits first datagrams relating to an availability of signal parameters measured at the base station. The first datagrams are preferably beacon frames. After initiating an ascertainment of the signal quality of the radio link between the radio base station and the radio subscriber station and upon receiving a first datagram, the radio subscriber station transmits a second datagram to the base station with a request to measure signal parameters. The second datagram comprises at least an indication of a time period for the measurement. In addition, the second datagram may comprise, for example, an indication of at least one signal parameter to be captured, representing a selection of signal parameters indicated in the first datagram.

In accordance with the invention, the radio base station, upon receiving a second datagram, and the radio subscriber station simultaneously perform a capture of respectively locally measured signal parameters of the radio link between the radio base station and the radio subscriber station. In a capture of signal parameters, the radio base station advantageously transmits third datagrams periodically with measured values to the radio subscriber station. The respectively locally measured signal parameters may, for example, be presented together on a user interface allocated to the radio subscriber station.

The present invention offers the advantages that a connection analysis is no longer performed only on a WLAN client or the like, but also in parallel at a WLAN access point. In this way, causes of connection failures or falling data rates can be identified in many cases, where the causes are not readily detectable with a one-way analysis on a WLAN client. Examples of cases of this type are a weak or attenuated transmission power from a WLAN client to a WLAN access point or an increased noise influence in the vicinity of a WLAN access point.

In accordance with an advantageous embodiment of the method in accordance with the invention, the second datagram comprises at least an indication of a sampling rate. The radio base station and the radio subscriber station accordingly perform the capture of the respectively locally measured signal parameters at this sampling rate. The radio base station can essentially be connected to a plurality of radio subscriber stations. Here, upon receiving a respective second datagram, the radio base station, simultaneously with a plurality of radio subscriber stations, each perform a capture of locally measured signal parameters.

In accordance with one preferred embodiment of the present invention, during a handover procedure of the radio subscriber station from the radio base station to a further radio base station, the radio base station or the radio subscriber station transmits a second datagram to the further radio base station with a request to measure signal parameters that are to be captured during a remaining time period. Upon receiving a second datagram, the further radio base station advantageously starts a capture of locally measured signal parameters of the radio link between the further radio base station and the radio subscriber station and transmits a fourth datagram relating to a start of the capture to the radio base station. Upon receiving a fourth datagram, the radio base station can end the capture of the locally measured signal parameters.

In a further embodiment of the method in accordance with the invention, the further radio base station periodically transmits third datagrams with measured values to the radio subscriber station during a capture of signal parameters. Accordingly, the signal parameters respectively locally measured by the radio base station, the further radio base station and the radio subscriber station are advantageously displayed together on the user interface allocated to the radio subscriber station.

The radio base station in accordance with the invention implements the method in accordance with the disclosed embodiments and is configured to periodically transmit first datagrams relating to an availability of signal parameters measured at the radio base station. The radio base station is furthermore configured to receive a second datagram from a radio subscriber station with a request to measure signal parameters. The second datagram comprises at least an indication of a time period for the measurement. In addition, the radio base station is configured, upon receiving a second datagram, to perform a capture of locally measured signal parameters of a radio link between the radio base station and the radio subscriber station simultaneously with the radio subscriber station.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in detail below on the basis of an example embodiment with reference to the drawings, in which.

DETAILED DESCRIPTION OF THE EXEMPLARY EMBODIMENTS

Figure 1:
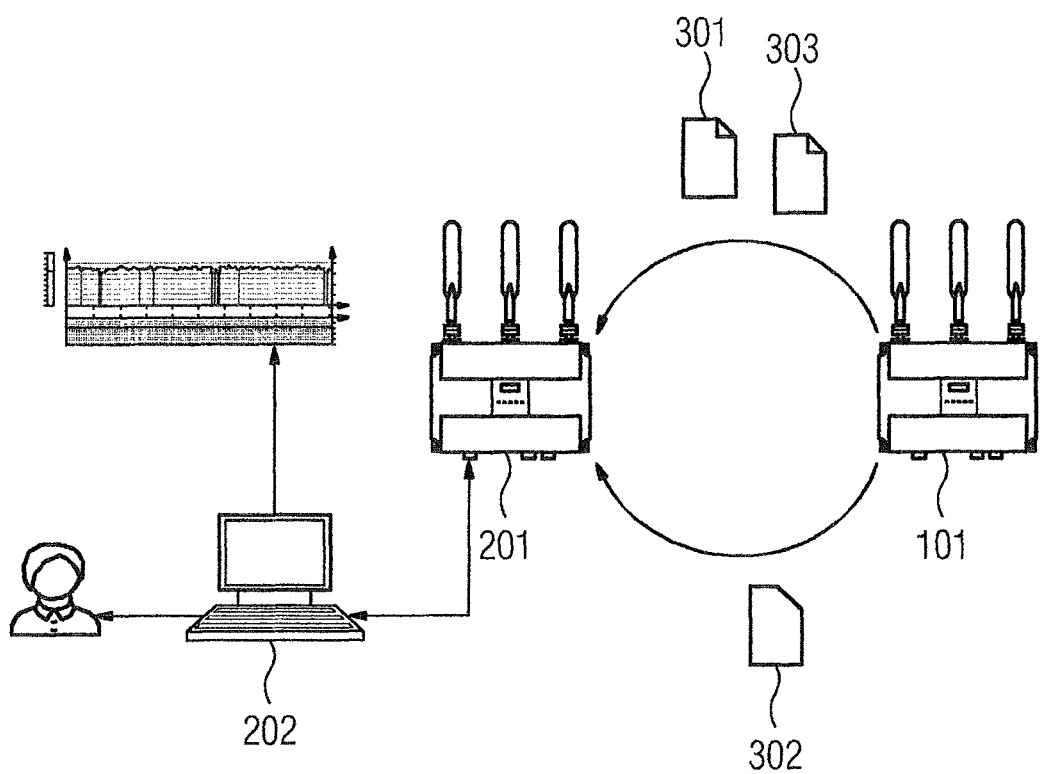
FIG. 1 shows a WLAN communication system with a WLAN access point and a WLAN client station in accordance with the invention.

The WLAN communication system shown in FIG. 1 comprises a WLAN access point 101 and a WLAN client station 201 that is connected via a radio link to the WLAN access point 101. The following descriptions are not limited to WLAN communication systems, but apply generally to radio communication systems in which radio subscriber stations are connected via radio links to radio base stations. In this regard, the WLAN access point 101 is representative of radio base stations, whereas the WLAN client station 201 is representative of radio subscriber stations. Instead of WLAN stations, radio transceiver stations can therefore essentially also be used for a WiMax, Universal Mobile Telecommunications System (UMTS), Long Term Evolution (LTE) mobile radio communication network or another mobile radio communication network.

In a two-way ascertainment of a signal quality of the radio link between the WLAN access point 101 and the WLAN client station 201, the WLAN access point 101 periodically transmits first datagrams 301 relating to an availability of signal parameters measured at the WLAN access point 101 to WLAN client stations within its range. In the present exemplary embodiment, the first datagrams 101 are beacon frames.

Following a user-controlled initiation of the ascertainment of the signal quality on a computer-based control unit 202 which is connected to a WLAN client station 201 and in the presence of a first datagram 301 relating to the availability of signal parameters measured at the WLAN access point 101, the WLAN client station 201 transmits a second datagram 302 to the WLAN access point 101 with a request to measure signal parameters. A second datagram 302 of this type comprises an indication of a time period for the measurement and an indication of signal parameters which are to be captured, representing a selection of signal parameters indicated in the first datagram 301. In addition, the second datagram 302 comprises an indication of a sampling rate for the measurement to be performed by the WLAN access point 101.

The computer-based control unit 202 may be allocated, for example, at control system level to a Supervisory Control and Data Acquisition (SCADA) system or at field level to a sensor or actuator system of an industrial automation system. In turn, a sensor or actuator system of this type may in turn comprise a production robot, a drive for a conveyor system or an operating and monitoring station on a production line.

Upon receiving a second datagram 302, the WLAN access point 101, simultaneously with the WLAN client station 201, performs a capture of locally measured signal parameters of the radio link between the WLAN access point 101 and the WLAN client station 201. Both the WLAN access point 101 and the WLAN client station 201 perform the capture of the respectively locally measured signal parameters at the sampling rate indicated in the second datagram 302.

The WLAN access point 101 transmits captured signal parameters or measured values periodically by means of third datagrams to the WLAN client station 201. The respectively locally measured signal parameters are then presented together on a display unit of the computer-based control unit 202. The WLAN access point 101 can essentially be connected simultaneously to a plurality of WLAN client stations. In this case, upon receiving a respective second datagram 302, the WLAN access point 101 performs a capture of locally measured signal parameters, in each case simultaneously with a plurality of WLAN client stations.

Figure 2:
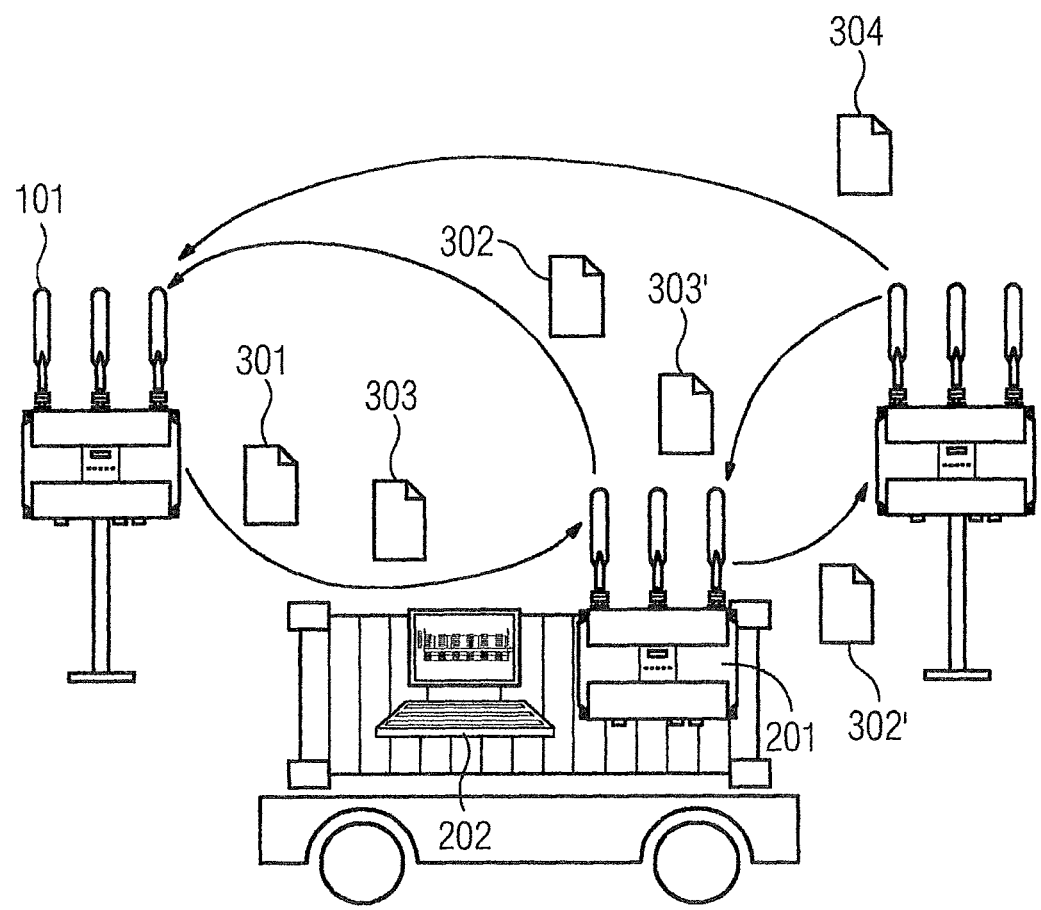
FIG. 2 shows a WLAN communication system with two WLAN access points and a mobile WLAN client station during a handover procedure in accordance with the invention.

FIG. 2 shows a WLAN communication system that comprises two WLAN access points 101,102 and a mobile WLAN client station 201. During a handover procedure, the mobile WLAN client station 201 changes its radio link from the WLAN access point 101 to a further WLAN access point 102 and transmits a second datagram 302' with a request to the further WLAN access point 102 to measure signal parameters which are to be captured during a remaining time period. This second datagram 302' could essentially be transmitted by the WLAN access point 101 to the further WLAN access point 102.

Upon receiving a second datagram 302', the further WLAN access point 102 starts a capture of locally measured signal parameters of the radio link between the further WLAN access point 102 and the further WLAN client station 201 and transmits a fourth datagram 304 relating to a start of the capture either directly or via the mobile WLAN client station 201 to the WLAN access point 101. The WLAN access point 101 ends the capture of the locally measured signal parameters on receiving a fourth datagram 304. Conversely, during a capture of signal parameters, the further WLAN access point 102 periodically transmits third datagrams 303' with measured values to the WLAN client station 201. The signal parameters respectively locally measured by the WLAN access point 101, the further WLAN access point 102 and the WLAN client station 201 are presented together on the display unit of the computer-based control unit 202.

Figure 3:
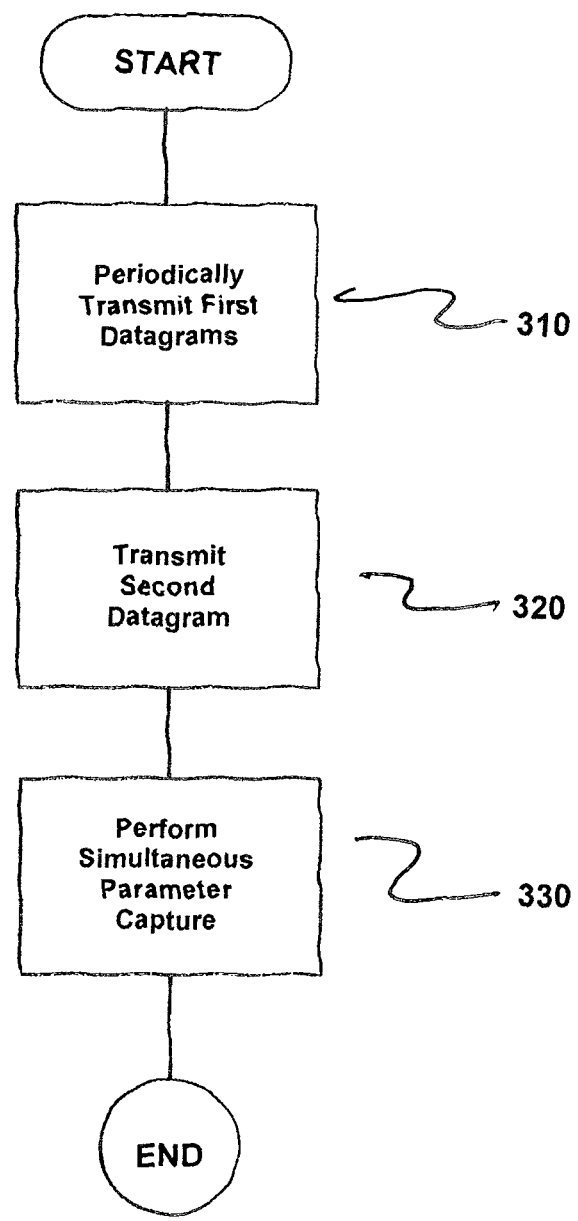
FIG. 3 is a flowchart of the method in accordance with the invention.

FIG. 3 is a flowchart of a method for ascertaining a signal quality of a radio link between a radio base station and at least one radio subscriber station. The method comprises periodically transmitting, by the radio base station 101, first datagrams 301 relating to an availability of signal parameters measured at the base station, as indicated in step 310.

Next, a second datagram 302 is transmitted by the radio subscriber station to the radio base station 101 with a request to measure signal parameters, after initiating an ascertainment of the signal quality of the radio link between the radio base station 101 and the radio subscriber station 201 and upon receiving a first datagram, as indicated in step 320. In accordance with the invention, the second datagram 302 comprises at least an indication of a time period for the measurement.

Next, upon receiving the second datagram 302, the radio base station 101 and the radio subscriber station 201 simultaneously perform a capture of respectively locally measured signal parameters of the radio link between the radio base station and the radio subscriber station, as indicated in step 330.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for ascertaining a signal quality of a radio link between a radio base station and at least one radio subscriber station, the method comprising:
   transmitting periodically, by the radio base station, first datagrams relating to an availability of signal parameters measured at the base station;
   transmitting, by the radio subscriber station, a second datagram to the radio base station with a request to measure signal parameters, after initiating an ascertainment of the signal quality of the radio link between the radio base station and the radio subscriber station and upon receiving a first datagram, the second datagram comprising at least an indication of a time period for the measurement; and
   performing, by the radio base station and the radio subscriber station simultaneously, based on the indication of the time period for the measurement of the second datagram, a capture of respectively locally measured signal parameters of the radio link between the radio base station and the radio subscriber station.

2. The method as claimed in claim 1, wherein the second datagram comprises an indication of at least one signal parameter to be captured, representing a selection of signal parameters indicated in the first datagram.

3. The method as claimed in claim 2, wherein the second datagram comprises at least an indication of a sampling rate; and wherein the radio base station and the radio subscriber station perform the capture of the respectively locally measured signal parameters at said sampling rate.

4. The method as claimed in claim 2, wherein the radio base station periodically transmits third datagrams with measured values to the radio subscriber station during a capture of signal parameters.

5. The method as claimed in claim 1, wherein the second datagram comprises at least an indication of a sampling rate; and wherein the radio base station and the radio subscriber station perform the capture of the respectively locally measured signal parameters at said sampling rate.

6. The method as claimed in claim 5, wherein the radio base station periodically transmits third datagrams with measured values to the radio subscriber station during a capture of signal parameters.

7. The method as claimed in claim 1, wherein the radio base station periodically transmits third datagrams with measured values to the radio subscriber station during a capture of signal parameters.

8. The method as claimed in claim 7, wherein the respectively locally measured signal parameters are presented together on a user interface allocated to the radio subscriber station.

9. The method as claimed in claim 1, wherein the radio base station is connected to a plurality of radio subscriber stations and, upon receiving a respective second datagram, performs a capture of each locally measured signal parameters simultaneously with a plurality of radio subscriber stations.

10. The method as claimed in claim 1, wherein one of (i) the radio base station and (ii) the radio subscriber station transmits a second datagram to a further radio base station during a handover procedure of the radio subscriber station from the radio base station to the further radio base station with a request to measure signal parameters which are to be captured during a remaining time period.

11. The method as claimed in claim 10, wherein, upon receiving a second datagram, the further radio base station starts a capture of locally measured signal parameters of the radio link between the further radio base station and the radio subscriber station and transmits a fourth datagram relating to a start of the capture to the radio base station; and wherein the radio base station ends the capture of the locally measured signal parameters upon receiving the fourth datagram.

12. The method as claimed in claim 11, wherein, during a capture of signal parameters, the further radio base station periodically transmits third datagrams with measured values to the radio subscriber station, and wherein the signal parameters respectively locally measured by the radio base station, the further radio base station and the radio subscriber station are displayed together on the user interface allocated to the radio subscriber station.

13. The method as claimed in claim 1, wherein the first datagrams are beacon frames.

14. A radio base station comprising:
a processor; and
memory;
wherein the radio base station is configured to periodically transmit first datagrams relating to an availability of signal parameters measured at the radio base station;
wherein the radio base station is further configured to receive a second datagram from a radio subscriber station with a request to measure signal parameters, the second datagram comprising at least an indication of a time period for the measurement; and
wherein the radio base station is further configured to, based on the indication of the time period for the measurement of the second datagram, perform a capture, simultaneously with the radio subscriber station, of locally measured signal parameters of the radio link between the radio base station and the radio subscriber station.

* * * * *